(12) United States Patent
Sobel et al.

(10) Patent No.: US 9,037,608 B1
(45) Date of Patent: May 19, 2015

(54) MONITORING APPLICATION BEHAVIOR BY DETECTING FILE ACCESS CATEGORY CHANGES

(75) Inventors: William E. Sobel, Cupertino, CA (US); Brian Hernacki, Cupertino, CA (US)

(73) Assignee: Symantec Corporation, Mountain View, CA (US)

( * ) Notice: Subject to any disclaimer, the term of this patent is extended or adjusted under 35 U.S.C. 154(b) by 1896 days.

(21) Appl. No.: 12/053,316

(22) Filed: Mar. 21, 2008

(51) Int. Cl.
*G06F 17/30* (2006.01)

(52) U.S. Cl.
CPC ................................ *G06F 17/30985* (2013.01)

(58) Field of Classification Search
CPC combination set(s) only.
See application file for complete search history.

(56) References Cited

U.S. PATENT DOCUMENTS

| | | | |
|---|---|---|---|
| 6,029,195 A * | 2/2000 | Herz | 725/116 |
| 7,490,244 B1 * | 2/2009 | Kennedy et al. | 713/188 |
| 2007/0186212 A1 * | 8/2007 | Mazzaferri et al. | 718/1 |
| 2008/0109871 A1 * | 5/2008 | Jacobs | 726/1 |

* cited by examiner

*Primary Examiner* — Shyue Jiunn Hwa
(74) *Attorney, Agent, or Firm* — Fenwick & West LLP

(57) ABSTRACT

A security module determines categories of files normally accessed by a software application. The security module monitors file accesses of the application to determine whether the application accesses files belonging to different categories than it normally accesses. If the categories of the files accessed are the same, then the file accesses are allowed to proceed. If the categories of the files accessed are different, then the security module takes a security action.

20 Claims, 5 Drawing Sheets

MONITORING APPLICATION BEHAVIOR BY DETECTING FILE ACCESS CATEGORY CHANGES

BACKGROUND OF THE INVENTION

1. Field of the Invention

This invention pertains in general to computer security and in particular to behavior-based blocking of programs executing on a computer.

2. Description of the Related Art

Modern computer systems are often susceptible to a wide variety of security threats on the part of software that secretly performs operations not desired by the computer user, such as theft of important data, e.g. financial records. Such malicious software ("malware") can include not only software surreptitiously smuggled onto the user's computer unbeknownst to the user, but also seemingly reputable software applications that have formerly behaved in a benign manner. This latter type of application may later begin to behave in a malicious fashion for a variety of reasons, such as the installation of an update containing malicious code inserted by an insider with access to the application code, or the triggering of "time bomb" code set to go off in response to a given event, such as the arrival of a specific date or the lapse of a given length of time since the application was installed.

Computer security solutions are generally transitioning from the more permissive "blacklist" based model in which all software not matching a set of known criteria, such as signatures of known malware, is permitted to execute freely, to a more restrictive "whitelist" based model in which only software on a "trusted" list is allowed to do so. However, since even trusted software applications may begin to behave maliciously at a future date, even whitelist-based security systems may benefit from monitoring the actual behavior of the software.

One form of such behavior-based monitoring involves examining the files and directories that the software accesses to determine aberrations that might signal malicious behavior. Unfortunately, conventional systems employing such an approach frequently incorrectly identify a particular software application as possible malware, thereby frustrating users by blocking their applications from performing their desired tasks or by issuing false alerts to which the user must respond. Such misidentifications occur particularly frequently in the case of applications accessing files that are broadly or randomly distributed, such as word processor files or image files, which are frequently saved in a variety of different locations throughout the file system.

BRIEF SUMMARY

The difficulties described above are addressed by a computer, method, and computer-readable storage medium that identify and apply categories of expected file usage to address an attempted vulnerability exploit. Embodiments of the method comprise monitoring an access of a file by an application and identifying a category of the accessed file. The method also comprises identifying a set of categories with which the application is associated and determining whether the category of the accessed file is within the set of categories with which the application is associated. The method further comprises triggering a security response responsive to the category of the accessed file not being within the set of categories with which the application is associated.

Embodiments of the computer-readable storage medium comprise a file access monitoring module configured to monitor an access to a file by the application. The computer-readable storage medium also comprises a file categorization module configured to identify a category of the accessed file, as well as a deviation detection module configured to identify a set of categories with which the application is associated and further configured to determine whether the category of the accessed file is within the set of categories with which the application is associated. The computer-readable storage medium further comprises a deviation response module configured to trigger a security action, responsive to the category of the accessed file not being within the set of categories with which the application is associated.

A computer adapted to prevent execution of malicious code in a software application comprises a file access monitoring module configured to monitor an access to a file by the application. The computer also comprises a file categorization module configured to identify a category of the accessed file, as well as a deviation detection module configured to identify a set of categories with which the application is associated and further configured to determine whether the category of the accessed file is within the set of categories with which the application is associated. The computer further comprises a deviation response module configured to trigger a security action, responsive to the category of the accessed file not being within the set of categories with which the application is associated.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
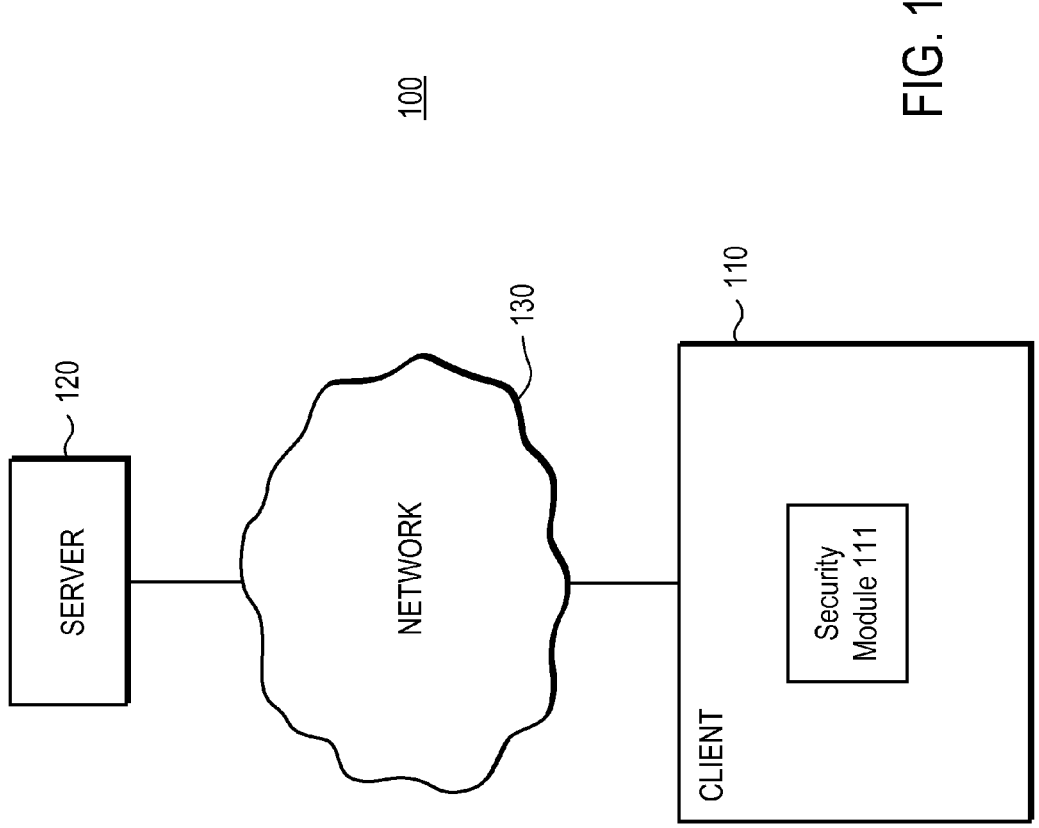
FIG. 1 is a high-level block diagram of a computing environment according to one embodiment.

FIG. 1 is a high-level block diagram of a computing environment 100 according to one embodiment. FIG. 1 illustrates a client 110 and a server 120 connected by a network 130. Only one client 110 and one server 120 are shown in FIG. 1 in order to simplify and clarify the description. Embodiments of the computing environment 100 can have thousands or millions of servers 120 and clients 110 connected to the network 130.

The client 110 can execute a variety of software applications, such as a web browser, email program, word processor, spreadsheet, image viewer, or music player. As mentioned above, some of these applications may be malware, containing malicious code that secretly performs undesirable actions, such as modifying system files or copying personal financial data.

A security module 111 executing on the client 110 monitors the file accesses by the various applications on the client 110 and determines the categories of information that each application accesses. Subsequently, the security module 111 utilizes the category information derived from the monitoring to detect potentially malicious actions of an application by determining whether the application is attempting to access a new category of information that it did not formerly access. If so, the security module 111 takes an action to prevent the potentially malicious file access from causing harm.

In some embodiments, a server 120 may provide information to the security module 111, instead of, or in addition to, the category information derived by the security module 111 itself. In such embodiments, the server 120 provides the information to the client 110 via the network 130. The network 130 represents the communication pathways between the server 120 and client 110. In one embodiment, the network 130 is the Internet. The network 130 can also utilize dedicated or private communications links that are not necessarily part of the Internet. In one embodiment, the network 130 uses standard communications technologies and/or protocols such as Ethernet, 802.11, etc. Similarly, the networking protocols used on the network 130 can include the transmission control protocol/Internet protocol (TCP/IP), the hypertext transport protocol (HTTP), the simple mail transfer protocol (SMTP), the file transfer protocol (FTP), etc. The data exchanged over the network 130 can be represented using technologies and/or formats including the hypertext markup language (HTML), the extensible markup language (XML), etc. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

Figure 2:
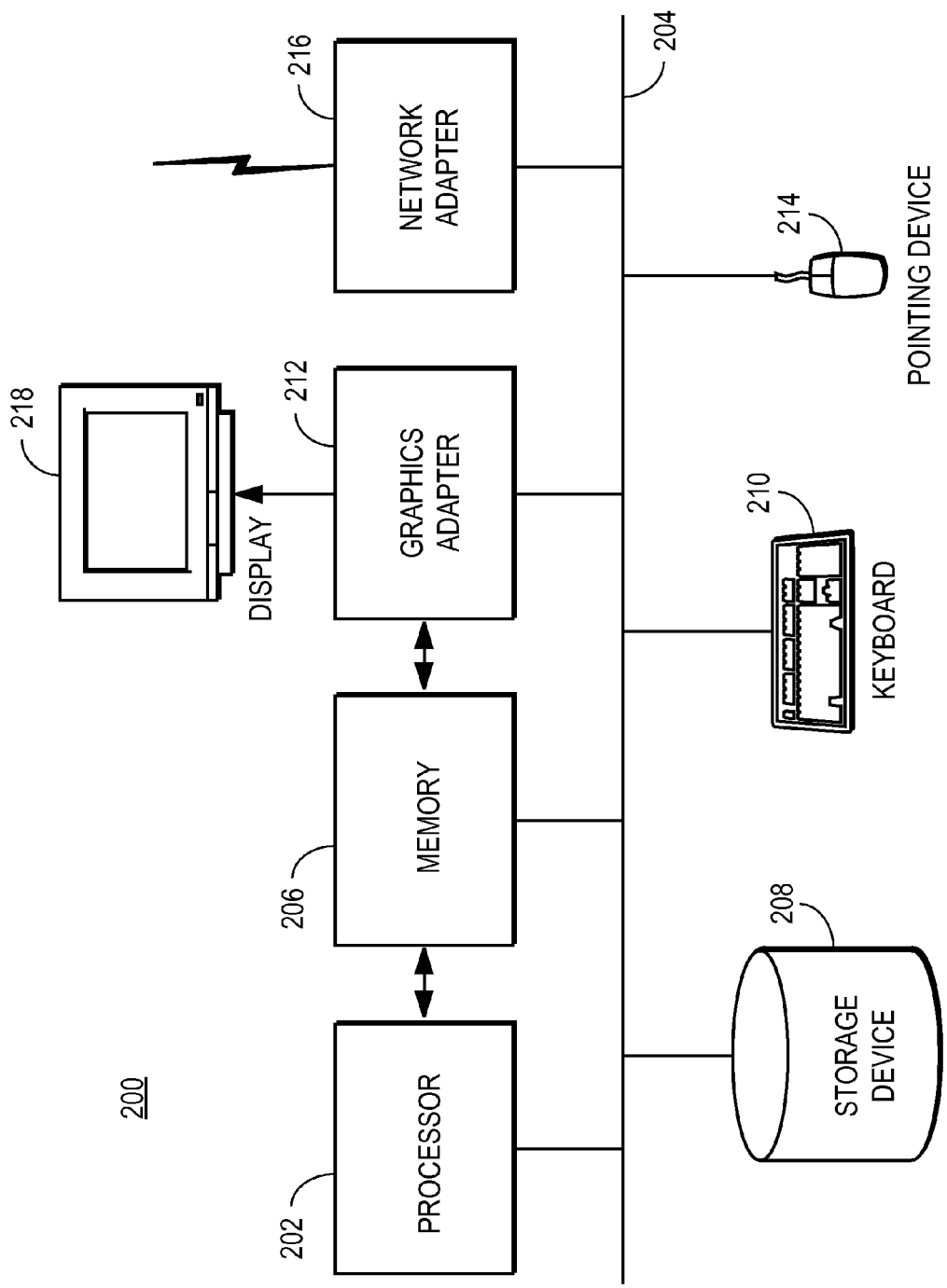
FIG. 2 is a high-level block diagram illustrating a typical computer for use as a server or client according to one embodiment.

FIG. 2 is a high-level block diagram illustrating a typical computer 200 for use as a client 110 or server 120 according to one embodiment. Illustrated are a processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

The processor 202 may be any general-purpose processor such as an INTEL x86 compatible-CPU. The memory 206 may be, for example, firmware, read-only memory (ROM), non-volatile random access memory (NVRAM), and/or RAM, and holds instructions and data used by the processor 202. The pointing device 214 may be a mouse, track ball, or other type of pointing device, and is used in combination with the keyboard 210 to input data into the computer 200. The graphics adapter 212 displays images and other information on the display 218. The network adapter 216 couples the computer 200 to the network 130.

The storage device 208 is, in one embodiment, a hard disk drive but can also be any other device capable of storing data, such as a writeable compact disk (CD) or DVD, or a solid-state memory device. The storage device 208 stores a plurality of files, e.g. according to a standard file system structure provided the operating system used by the computer 200. Each of the plurality of files may belong to a different category, such as text, image, video, etc. Files containing different types of information may fall within the same category: for example, both Windows Media Audio (wma) and Waveform Audio (way) files, which contain distinct types of information, are used for representing sounds.

The types of computers 200 utilized by the entities of FIG. 1 can vary depending upon the embodiment and the processing power utilized by the entity. For example, a client 110 that is a mobile telephone typically has limited processing power, a small display 218, and might lack a pointing device 214. The server 120, in contrast, may comprise multiple blade servers working together.

As is known in the art, the computer 200 is adapted to execute computer program modules. As used herein, the term "module" refers to computer program logic and/or data for providing the specified functionality. A module can be implemented in hardware, firmware, and/or software. In one embodiment, the modules are stored on the storage device 208, loaded into the memory 206, and executed by the processor 202.

In addition, this description uses the term "application" to refer to a program executed by the computer 200. The application is formed of one or more files that typically reside on the storage device 208 and are loaded into memory 206 when executed. Different applications may access different types of files. For example, an application such as a word processing program typically accesses rich text or plain text documents, and an application such as a web page editor typically accesses HTML, text, scripting, or image files.

Figure 3:
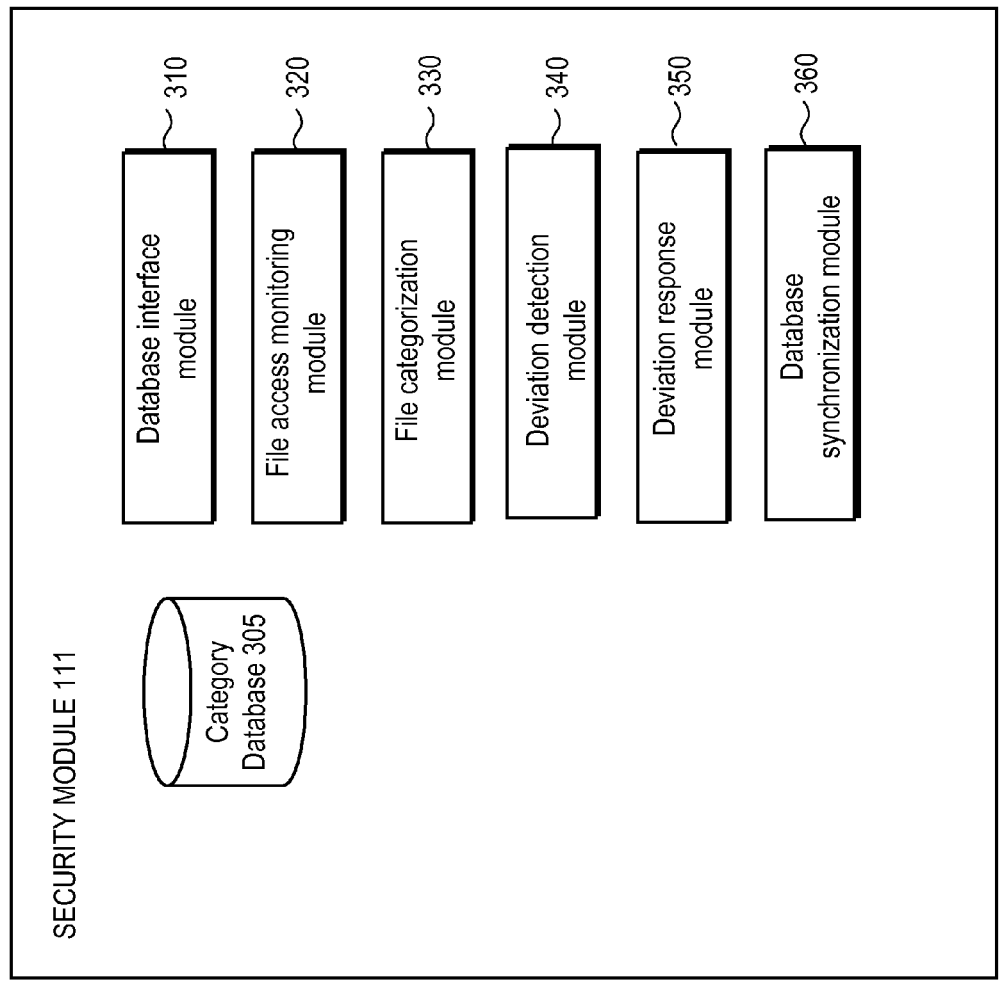
FIG. 3 is a high-level block diagram illustrating a detailed view of the security module according to one embodiment.

FIG. 3 is a high-level block diagram illustrating a detailed view of the security module 111 of FIG. 1 according to one embodiment.

A category database 305 associates categories of files with the applications that use them. In one embodiment, the categories include word processing files, sound files, video files, image files, financial files, operating system files, source code files, web page files, spreadsheet files, and database files, though it is appreciated that that many other such categorizations are equally possible. In one embodiment, the category database 305 contains a list of applications and for each listed application further lists the set of file categories accessed by that application. For example, the category database 305 on a particular client might indicate that an Application A accesses image, sound, and video files, that another Application B accesses text and web page files, and that a third Application C accesses financial files. Additionally, the category database 305 contains, for each distinct category, a description of the category that is meaningful to users, such as "Financial data" for a category representing financial files.

The category database 305 can be implemented in a variety of manners. For example, an application in the category database 305 may be represented by a string specifying the name and path of an executable file representing the application, and/or by a hash value of an executable file for the application. The categories of files accessed by a given application could be represented by a variable-length list of categories, with each category specified by a name and/or an index into a category list. The database itself can be implemented in various ways, such as tables of a relational database, a flat text file, a binary file, or the like. Numerous other alternate representations could be equally employed.

A database interface module 310 reads from and writes to the category database 305. It is implemented as appropriate to the particular implementation of the category database 305 itself. For example, if the category database is implemented as a text file, then database interface module 310 could be implemented using standard text file input and output functions. Or if the category database is implemented as tables of a relational database management system (RDBMS), then the database interface module 310 could be implemented in terms of calls to the RDBMS's API.

A file access monitoring module 320 monitors application accesses to files. In one embodiment, such monitoring is performed in a training phase of security module operation, during which the security module 111 observes the files that a given application accesses during normal operation and updates the category database 305 accordingly. Monitoring is also performed in a security monitoring phase, during which the security module 111 determines whether access to a given file represents a deviation from prior behavior. Note that different applications can be in different phases, e.g. a recently-installed application may be in the training phase, and an application installed a considerable time before may be in the security monitoring phase. The file access monitoring module 320 can be implemented in various ways, such as a file system filter driver employing a low-level Application Programming Interface (API) of the operating system to register itself to execute when files are accessed. In one embodiment, information on the files accessed by a given application during normal operation is downloaded from the server 120 and used to update the category database 305, thereby obviating the need to perform the training phase.

A file categorization module 330 determines the category of a particular file, the determined category corresponding to the categories within the category database 305. The file category determination may be accomplished by examining characteristics of the file to determine a specific type of information contained by the file. The determined type of information may then be mapped to an associated category.

The file categorization module 330 may examine different characteristics when determining the type of information contained by the file. One embodiment of the file categorization module 333 examines the file extension, if present, to determine the type of information within the file. For example, a file having an extension of "way" might be presumed to contain data in the Waveform Audio format. Similarly, a file having an extension of "mp3" or "qif" might be presumed to contain data in the MP3 music format or the Quicken financial data format, respectively.

Another file characteristic that the file categorization module 330 can examine is explicit type codes provided by the operating system, if any. For example, a file for MAC OS X could have an associated type code of "MP3", indicating that the file contains sound data in the MP3 format. Yet another file characteristic is the actual content of the file. For example, the file categorization module 330 could examine file content to detect patterns indicative of a particular of information. Multiple characteristics of a file can be analyzed to determine the type of information within the file. For example, if a type code of the file, or a file extension, indicates that the file is an HTML file, then the content of the file could be further examined to determine whether it contains HTML tags and other patterns characteristic of HTML files.

The file categorization module 330 maps the determined file type to the more general file category. For example, in one embodiment the file categorization module 330 considers files having information in the MP3, Windows Media Audio, and Waveform Audio formats (e.g. represented by the extensions "mp3", "wma" and "way") to all represent the category "Sound", and files in the Quicken Interchange Format and Open Financial Exchange format (e.g. represented by the extensions "qif" and "ofx") to both represent the category "Financial." Such mappings of file information types to general categories may be provided in various ways. In one embodiment, such mappings are specified by the provider of the software embodying the security module 111 and are made available to the file categorization module 330 (e.g. as part of category database 305) at the time that such software is installed on the client 110. In another embodiment, users may add their own type-to-category mappings. Note that it is also possible to determine a category for a file without first determining an intermediate file type and mapping that type to a category. For example, the file categorization module 330 may directly determine, based purely on analysis of the actual data in the file, that the file is within the "Sound" category.

The file category information constitutes high-level conceptual data upon which to detect whether an application is deviating from its prior behavior. Since file accesses are screened based on the conceptual file category information rather than file information types, the use of file category information can correctly allow an application to access other file types within the same category without being considered to be deviating from its prior behavior.

A deviation detection module 340 examines file accesses detected during the security monitoring phase and determines whether the file accesses deviate from the norm for the application as established during a training phase. Such deviations are detected based on the application attempting the access and the category of the file being accessed. If the category database 305 indicates that the application has previously accessed files of that category, then the access is not considered a deviation from prior behavior. If, however, the category database 305 indicates that the application has not previously accessed files of that category, then the deviation detection module 340 considers that a behavioral deviation is taking place. For example, an application that formerly had accessed only MP3 or Windows Media Audio files would be freely allowed to access Waveform Audio files, as well, since all three of these types fall within the category of sound files. However, an application that had formerly accessed only MP3 or Windows Media Audio files and that later attempted to access Quicken Interchange Format or Open Financial Exchange files would be considered to be deviating from its former behavior, since it transitioned from accessing only sound files to additionally accessing financial files.

A deviation response module 350 takes an appropriate security action in response to detection that an application has accessed a file of a category deviating from the application's norm. Such a security action could take a number of different forms, depending on the circumstances. For example, if the client 110 is a personal computer system used only by a single user, the security action could be to issue an alert to the user noting the deviation and asking whether to allow the application to take the desired action. Such an alert might be in the form of a dialog box with a message (e.g. "Application A, which usually accesses word processing and web page files, is now attempting to access financial data (C:\Documents\FinancialSettings\Expenses.qif). Do you want to allow this access?") and Yes/No buttons to allow or block the access. If the user response is to allow the access, the deviation response module 350 may further ask the user whether the user wishes to add that file category to the set of categories accessed by the application, as maintained by the category database 305, so as to prevent future alerts based on accesses to files of that same category. If the client 110 is a computer system having an administrator, then the response could be to issue an alert to the administrator and to block the access. Another possible security action is to scan the application to attempt to determine whether it contains a virus or other malicious code, and to block or allow the access dependent on the result of the scan. The choice of which of these possible types of security actions to take may be specified in a policy set by a person with authority for client 110, such as an end user or a system administrator.

Note that the category information of category database 305 enables the provision of a more meaningful message to a user when an alert is indeed issued. Thus, in the example above, rather than informing a user merely that Application A is attempting to access a Quicken Interchange Format (.qif) file, the deviation response module 350 may present the user with the more meaningful message that Application A is attempting to access financial data.

In some embodiments the server 120 may be employed to provide additional information to the various sub-modules of the security module 111. For example, the mappings of file information types to categories maintained by the file categorization module 330 may be updated periodically from the server 120. As another example, in one embodiment the provider of the software implementing the security module 111 maintains globally-available information on associations between applications and categories, and the security module 111 accordingly further comprises a database synchronization module 360 which updates the category database 305 to reflect such information. In such an embodiment the database synchronization module 360 could send the category information determined locally by the file access monitoring module 320 and file categorization module 330 to the server 120, which would aggregate the provided information to determine an overall behavior of the application across the entire set of client application instances. Then, the database synchronization module 360 of the client 110 could periodically download any additional category information and integrate it with the local category database 305.

Figure 4:
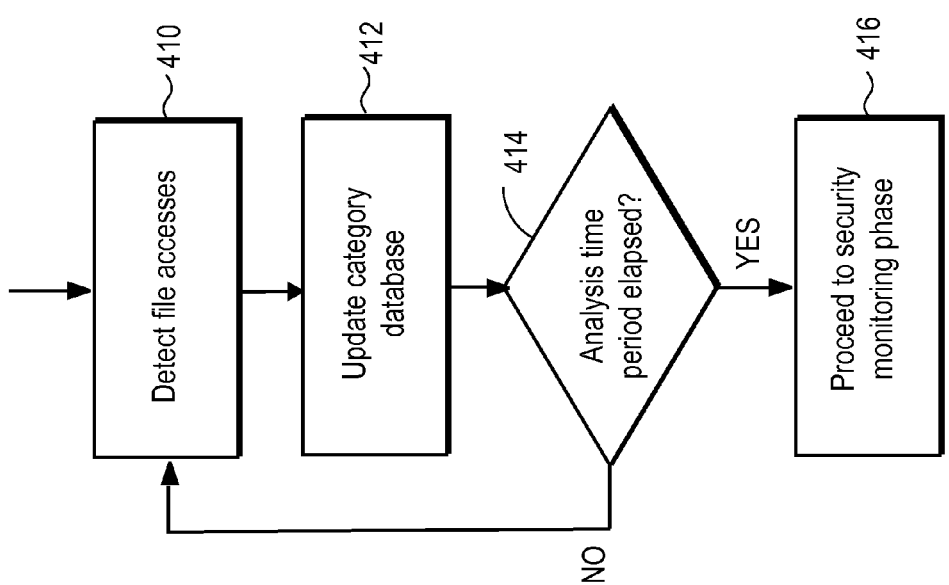
FIG. 4 is a flowchart illustrating steps for using the security module to determine the categories of files normally accessed by applications, according to one embodiment.

FIG. 4 is a flowchart illustrating steps for using the security module 111 to determine the categories of files normally accessed by applications, according to one embodiment. After installation of a new application, the security module 111 creates a new entry for the new application in the category database 305, and proceeds to analyze via the file access monitoring module 320, for some given period of time, the files accessed by the new application. The time period may be of the same duration for all applications, or it may vary, but in any case should be sufficiently long to allow observation of "normal" file access for an application. Additionally, it should be short enough that it is improbable that any "time bomb" malicious code will be triggered before the completion of the time period.

During this training phase, file accesses are detected 410 by the file access monitoring module 320 and mapped to categories by the file categorization module 330, as described above. When a file access pertains to a file corresponding to a new category not already associated with the new application, then the security module 111 decides whether to update the category database 305 to reflect the new category. In one embodiment, the category database 305 is updated the first time that a new file category is accessed. In other embodiments, it is not updated until the new file category has been accessed on a given number of occasions, within a given timeframe.

If a time period allotted for the training phase has not elapsed 414, then the security module 111 continues to detect 410 file accesses via the file access monitoring module 320. If the training phase time period has elapsed, however, the security module 111 proceeds from the training phase to the security monitoring phase depicted in FIG. 5.

Figure 5:
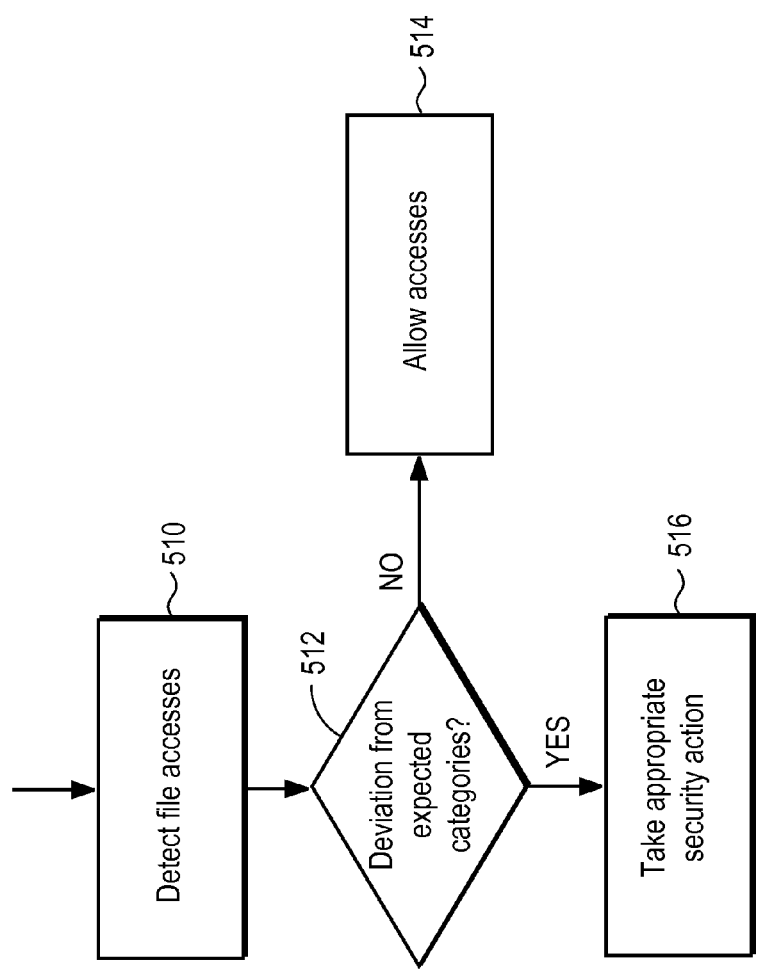
FIG. 5 is a flowchart illustrating steps for using the security module to provide security to a client according to one embodiment.

FIG. 5 is a flowchart illustrating steps for using the security module 111 to provide security to the client 110 according to one embodiment. Other embodiments perform the illustrated steps in different orders, and/or perform different or additional steps. The steps can be performed by multiple entities at different points in time.

At step 510, the file access monitoring module 320 monitors file accesses by an application, and the file categorization module 330 determines the categories represented by such file accesses. If the categories are already within the category database 305 for the application, then the security module 111 allows 514 the accesses to proceed without hindrance. However, the absence of a category in the entry of the category database 305 for that application, rather than causing an update of the category database 305, now potentially causes the deviation response module 350 to respond 516 with an appropriate security action in one of the manners discussed above. In one embodiment, the first access of a category not in the application's database entry triggers such a response, though it is also possible to respond only after a number of such accesses.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A computer-implemented method performed by a processor for preventing execution of malicious code in a plurality of software applications, the method comprising:
performing, by the processor, actions comprising:
monitoring, by a security module separate from the plurality of software applications, accesses made by the plurality of software applications to files;
identifying, b the security a category of a file accessed by an application of the plurality of software applications;
identifying, b the security a set of categories with which the application is associated;
determining, by the security module, whether the category of the accessed file is within the set of categories with which the application is associated; and
responsive to the category of the accessed file not being within the set of categories with which the application is associated, triggering, by the security module, a security action.

2. The method of claim 1, wherein determining whether the category of the accessed file is within the set of categories with which the application is associated comprises accessing a database describing the application and categories of files normally accessed by the application.

3. The method of claim 1, further comprising:
the security module monitoring, for a given period, accesses of files by the plurality of software applications;
the security module identifying categories of files accessed by the application during the given period;
the security module adding the identified categories of files to the set of categories with which the application is associated.

4. The method of claim 3, wherein the given period begins after a first usage of the application on a client system.

5. The method of claim 1, wherein the triggered security action comprises issuing an alert.

6. The method of claim 1, wherein the triggered security action comprises blocking the access to the file.

7. The method of claim 1, wherein identifying a category of the accessed file comprises:
identifying characteristics of the accessed file;
identifying, based on the characteristics, a type of information contained by the accessed file; and
mapping the identified type of information to the category based on the type of information contained by the accessed file.

8. The method of claim 7, wherein the characteristics comprise file system information about the accessed file.

9. The method of claim 7, wherein the characteristics comprise data content of the accessed file.

10. A computer-readable storage medium having executable computer program instructions embodied therein for preventing execution of malicious code in a software application, comprising:
- a file access monitoring module configured to monitor an access to a file by the application;
- a file categorization module configured to identify a category of the accessed file;
- a deviation detection module configured to identify a set of categories with which the application is associated, and further configured to determine whether the category of the accessed file is within the set of categories with which the application is associated; and
- a deviation response module configured to trigger a security action, responsive to the category of the accessed file not being within the set of categories with which the application is associated.

11. The computer-readable storage medium of claim 10, wherein determining whether the category of the accessed file is within the set of categories with which the application is associated comprises accessing a database describing the application and categories of files normally accessed by the application.

12. The computer-readable storage medium of claim 10, wherein:
- the file access monitoring module is further configured to monitor, for a given period after a first usage of an application on a client system, accesses of files by the application;
- the file categorization module is further configured to identify categories of files accessed by the application during the given period; and
- the file access monitoring module is further configured to add the identified categories of files to the set of categories with which the application is associated.

13. The computer-readable storage medium of claim 10, wherein identifying a category of the accessed file comprises:
- identifying characteristics of the accessed file;
- identifying, based on the characteristics, a type of information contained by the accessed file; and
- mapping the identified type of information to the category based on the type of information contained by the accessed file.

14. The computer-readable storage medium of claim 13, wherein the characteristics comprise file system information about the accessed file.

15. A computer system comprising:
- a computer-readable storage medium storing executable computer program modules, the computer program modules comprising:
  - a file access monitoring module configured to monitor an access to a file by the application;
  - a file categorization module configured to identify a category of the accessed file;
  - a deviation detection module configured to identify a set of categories with which the application is associated, and further configured to determine whether the category of the accessed file is within the set of categories with which the application is associated; and
  - a deviation response module configured to trigger a security action, responsive to the category of the accessed file not being within the set of categories with which the application is associated.

16. The computer of claim 15, wherein determining whether the category of the accessed file is within the set of categories with which the application is associated comprises accessing a database describing the application and categories of files normally accessed by the application.

17. The computer of claim 15, wherein:
- the file access monitoring module is further configured to monitor, for a given period after a first usage of an application on a client system, accesses of files by the application;
- the file categorization module is further configured to identify categories of files accessed by the application during the given period; and
- the file access monitoring module is further configured to add the identified categories of files to the set of categories with which the application is associated.

18. The computer of claim 15, wherein identifying the category of the accessed file comprises:
- identifying characteristics of the accessed file;
- identifying, based on the characteristics, a type of information contained by the accessed file; and
- mapping the identified type of information to the category based on the type of information contained by the accessed file.

19. The computer of claim 18, wherein the characteristics comprise data content of the accessed file.

20. The computer of claim 15, wherein the triggered security action comprises issuing an alert.

* * * * *

UNITED STATES PATENT AND TRADEMARK OFFICE
CERTIFICATE OF CORRECTION

PATENT NO. : 9,037,608 B1  
APPLICATION NO. : 12/053316  
DATED : May 19, 2015  
INVENTOR(S) : William E. Sobel and Brian Hemacki Page 1 of 1

It is certified that error appears in the above-identified patent and that said Letters Patent is hereby corrected as shown below:

Claims

Column 8, line 28, Claim 1, replace "b" with --by--; after "security," insert --module--

Column 8, line 31, Claim 1, replace "b" with --by--; after "security," insert --module--

Signed and Sealed this
Twenty-ninth Day of March, 2016

Michelle K. Lee
*Director of the United States Patent and Trademark Office*